Jan. 3, 1956 — B. E. O'CONNOR — 2,729,518
SHAFT VIBRATION STABILIZER
Filed Sept. 26, 1951 — 2 Sheets-Sheet 1

Inventor:
Bernard E. O'Connor
by Hill, Sherman, Meroni, [illegible] Attys

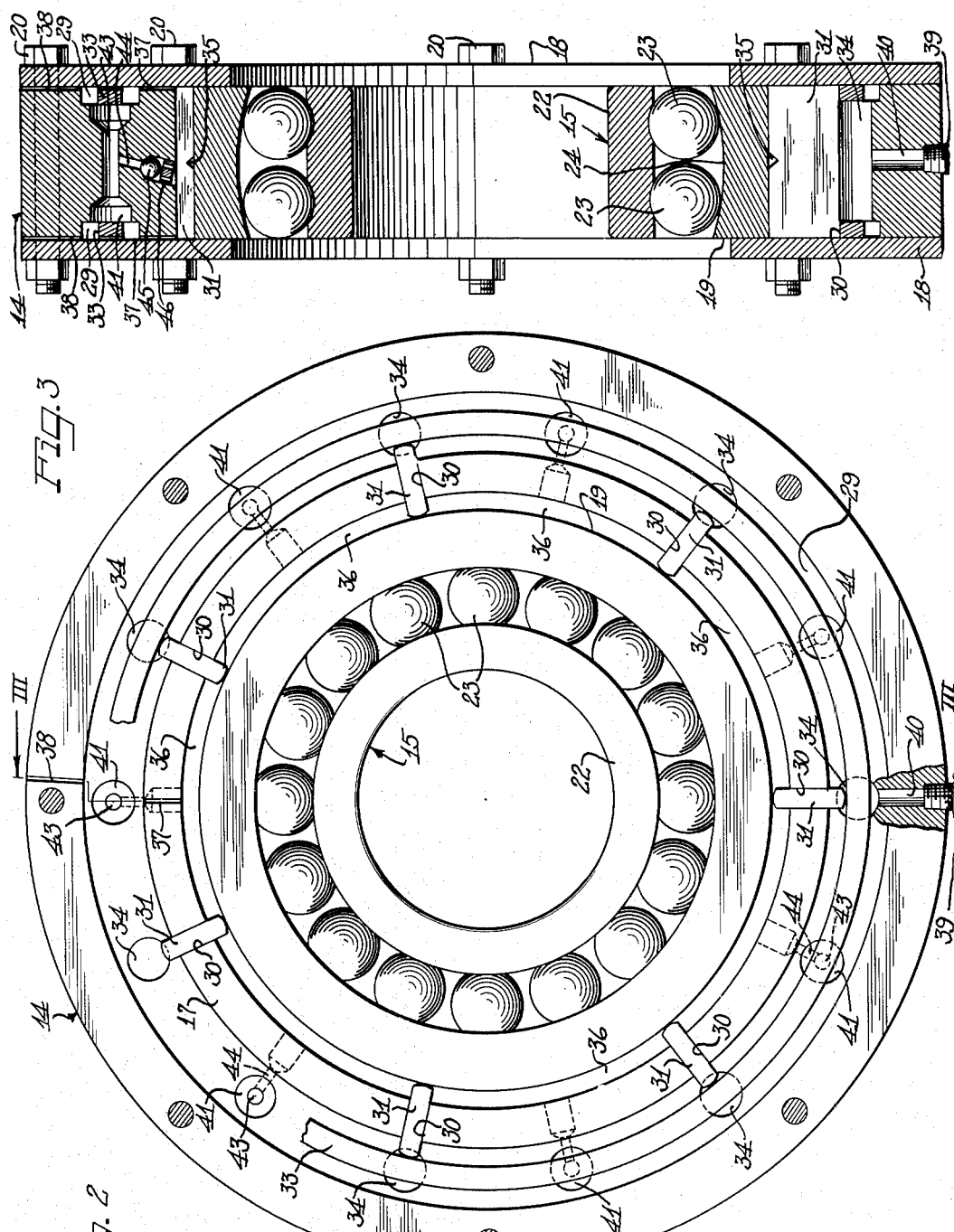

329,518
Patented Jan. 3, 1956

United States Patent Office

2,729,518

SHAFT VIBRATION STABILIZER

Bernard E. O'Connor, Buffalo, N. Y., assignor to Houdaille-Hershey Corporation, Detroit, Mich., a corporation of Michigan Application September 26, 1951, Serial No. 248,405

11 Claims. (Cl. 308—9)

This invention relates to improvements in vibration dampeners and more particularly relates to a stabilizer for stabilizing a shaft against vibration.

It is well known that any rotating shaft, with or without concentrated masses, has a critical speed at which it becomes dynamically unstable. At this speed vibration is likely to develop with very serious results. This critical speed is the speed at which the speed of rotation of the shaft equals the frequency of its natural vibration and is a function of the geometric dimensions and physical characteristics of the shaft such as the length, shape and density of the shaft and non-homogeneity of its material, and is particularly critical for long shafts with a long distance between the bearing supports therefor.

In the case of long shafts and particularly those which can be supported by two and only two self-aligning bearings, due to frequent distortion of the supports for the bearings with respect to each other, the vibration factor of the shaft is extremely serious, especially where the shaft rotates at high rates of speed. While the introduction of a third bearing for a shaft on stable supports may cure the vibration factor, where the supports are subject to distortion, a third bearing would cause the shaft to bend upon distortion of either of its supports. It has therefore been necessary to use large diameter shafts in such instances in order that the critical speed of the shaft will be above its operating speed.

This is particularly apparent in the case of a jet engine where the main body of the engine is subject to distortion and a compressor and turbine are connected with a single through shaft which is of necessity rather long. In such shafts, it is extremely desirable to keep down the weight of the shaft, which could be done if an intermediate bearing could be provided. Due to distortion of the main body of the engine, however, it hasn't been considered possible to provide an intermediate bearing for the shaft and the only way that has heretofore been found possible to reduce the vibration of the shaft is to use a shaft of a large enough diameter so that the critical speed of dynamic unstability will be above the operating speed of the shaft.

A principal object of my invention is to increase the speed at which a shaft becomes dynamically unstable without increasing the diameter thereof by providing a floating bearing for the shaft and by restraining high velocity floating movement of the bearing in radial directions.

Another object of my invention is to stabilize a rotating shaft by dampening high velocity whirling movement thereof intermediate its bearing supports.

Still another object of my invention is to stabilize the period of dynamic vibration of a shaft by providing a bearing for an intermediate portion of the shaft and by restraining high velocity movement of the bearing in radial directions by maintaining a self-compensating fluid pressure balance on the bearing.

A further object of my invention is to increase the speed at which the vibration of a shaft becomes critical by providing an intermediate radially movable bearing for the shaft and by maintaining a fluid pressure reaction on the bearing against high speed radial movement.

Still another and more detailed object of my invention is to stabilize the period of dynamic vibration of a shaft supported between two bearings by providing an intermediate bearing for the shaft and mounting this bearing on a stationary support for slow speed radial movement with respect thereto and by restraining high velocity whirling movement of said shaft by fluid pressure operated means interposed between the shaft and bearing support.

A still further object of my invention is to provide a means for stabilizing the period of critical vibration of a shaft supported on two supports subject to distortion, by providing an intermediate bearing for the shaft and mounting this bearing in a stationary bearing support for slow speed radial movement with respect thereto, and by restraining high speed whirling movement of the shaft with respect to the support by the provision of a plurality of interconnected fluid pressure chambers between the bearing and support, and by restricting the passage of fluid from one chamber and reducing the amplitude of vibration by the energy absorbed by the stabilizer.

These and other objects of my invention will appear from time to time as the following specification proceeds and with reference to the accompanying drawings wherein:

Figure 2 is a fragmentary end view of the vibration stabilizer shown in Figure 1, with one end cover removed and certain parts shown in section;

Figure 3 is a fragmentary sectional view taken substantially along line III—III of Figure 2.

Figure 1:
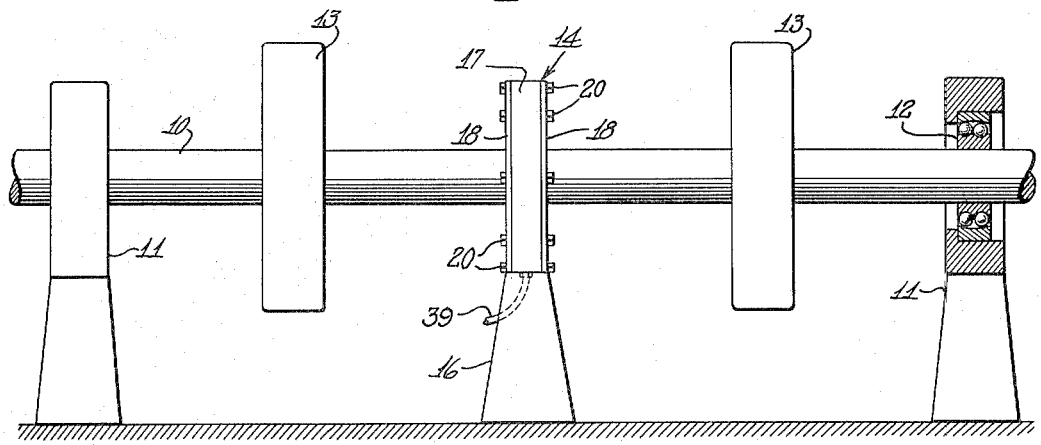
Figure 1 is a schematic view of a shaft mounted between two bearing supports, showing a vibration stabilizer constructed in accordance with my invention, at an intermediate portion of the shaft.

In Figure 1 of the drawings, I have diagrammatically shown a relatively long shaft 10 journaled at spaced apart points on spaced bearing supports 11, 11. The base for said bearing supports may be subject to distortion, or said supports may be on separate bases. Each bearing support 11 may carry a self-aligning bearing 12 for the shaft 10, as shown in the right hand side of Figure 1. It should here be understood that the bearing supports need not be subject to distortion and where they are not subject to distortion self-aligning bearings need not be used, and that the stabilizer of my invention may be utilized to stabilize the period of critical vibration of any shaft or rotating member, regardless of how it is supported.

Reference characters 13, 13 refer to rotating masses on the shaft inside of the bearing supports, which may be of any form, and may be driving means therefor and means driven therefrom. It is, of course, obvious that the rotating masses 13, 13 may be in any desired position on the shaft and may be outside of the bearing supports as well as within the bearing supports, as shown.

I have also shown a vibration stabilizer 14, located intermediate the bearing supports 11, 11 and forming in effect a third bearing support, offering substantially no resistance to slow relative displacement of said shaft and the bearing supports 11, 11 therefor. The vibration stabilizer 14 is herein shown as having a bearing 15 floatingly carried thereby for movement in a radial direction to accommodate said bearing and the shaft 10 for distortion of the two supports 11, 11 with respect to each other and to balance and restrain said bearing against high velocity radial movement by fluid under pressure.

The vibration stabilizer 14 is shown as being encased in a housing supported on a pedestal 16, which may be stationary, and as consisting in an outer ring 17 and annular end plates 18, 18 secured to opposite sides thereof and forming the end closure means for the housing. The end plates 18, 18 are shown as having slidable engagement with opposite sides of an inner ring 19 of the stabilizer, herein shown as being an outer race of the bearing 15. The end plates 18, 18 are shown as being secured to opposite faces of the ring 17 by means of through bolts and nuts 20, 20.

The bearing 15 is shown in Figure 3 as being a self-aligning anti-friction bearing, although it need not necessarily be such a bearing. Said bearing is shown as including an inner race 22, mounted on the shaft 10 within the outer race 19 and having a plurality of rows of balls 23, 23 interposed between said inner and outer races. Said balls may be retained by the usual retaining cages (not shown) and form rolling surfaces engaging a concave inner surface 24 of the outer race 19 of the bearing.

The ring 17 is shown as having aligned annular fluid distribution channels 29, 29 formed in the outer faces thereof and opening to the end plates 18, 18. If desired, suitable seals between said channels and end plates may be provided. The ring 17 also has a plurality of radial slots 30, 30 opening to the inner periphery thereof and to the channels 29, 29 and slidably carrying vanes 31, 31. The vanes 31, 31 engage the outer periphery of the ring 19 at their inner ends and are slidably guided in the slots 30, 30 for movement into the channels 29, 29 and engage reaction rings 33, 33 at their outer ends. The reaction rings 33, 33 floatingly mounted in the channels 29, 29 engage the outer ends of the sliding vanes 31, 31 and retain said vanes in engagement with the outer periphery of the ring 19.

Communication between the channels 29, 29 is afforded by means of a plurality of apertures 34, 34 communicating with the slots 30, 30 and also forming enlarged chambers within which the outer ends of the vanes 31, 31 may move. The spaces between the vanes 31, 31 and the inner periphery of the ring 17 and the outer periphery of the ring 19 form pressure chambers 36, 36 restraining high velocity radial movement of the bearing 15 with respect to the stationary ring 17 by the resistance offered by the fluid flowing between said chambers, as the volumetric capacity of said chambers is increased or decreased by relative movement of the ring 19 with respect to the ring 17. The vanes 31, 31 are thus like the vanes in the rotor of a vane-type pump, which is held from rotation and moves in a radial direction only.

Each vane 31 is shown as having a downwardly opening V-shaped notch 35 which with the outer periphery of the bearing ring 19 forms a restricted orifice for restricting the flow of fluid from one chamber to the other. Radial grooves 37 and 38 are formed in the outer faces of the ring 17 and lead from the upper chamber 36 to the channels 29, 29 and from said channels to the atmosphere, to allow air to bleed from the system.

Fluid is shown as being supplied to the bottom of the ring 17, through a conduit 39 threaded in a passageway 40, extending radially through said ring and communicating with the lower aperture 34 and the channels 29, 29. The chambers 36, 36 between the vanes for blades 31, 31 are supplied with fluid from the channels 29, 29 by transverse passageways 41, 41 communicating with the channels 29, 29 at their ends. One of said transverse passageways is provided for each chamber 36 and is shown as being located in radial alignment with the transverse center thereof although it need not be so located. Each passageway 41 is herein shown as having relatively large entering ends communicating with the channels 29, 29 and converging to a reduced diameter passage 43. A fluid passage 44 leads from the reduced diameter passage 43 to a pressure chamber 36. As herein shown, the passageway 44 has an enlarged diameter discharge portion having a ball 45 of a check valve therein, and retained in said passageway by an apertured retainer 46. The ball 45 is arranged to admit fluid as needed to the associated chamber, but to prevent the backflow of fluid into the channels 29, 29.

Any suitable fluid may be supplied to the interior of the ring 17 to form the reaction means for the bearing ring 19, such as oil which may be a silicone or a shock absorber oil. Oil tapped from the lubricating oil supply of the engine may also be used where the stabilizer is used to stabilize vibrations of a shaft of a jet engine. The oil may be supplied at various pressures, depending upon the operating conditions desired. Usually a sufficient volume of oil is supplied to the chambers 36, 36 to take care of leakage through the air bleeders 37 and 38 and between the sides of the bearing ring 19 and the plates 18, 18.

It is understood, of course, that the stabilizer 14 may be enclosed to collect the oil leaking through the air vent 37 and past the bearing ring 19 and that the oil so collected may be returned to the system for reuse.

It is further understood that suitable seals (not shown) may be provided between the side walls of the bearing ring 19 and the annular end plates 18, 18 to reduce the leakage of oil thereby, provided said ring is relatively free to move radially between said end plates.

When the chambers 36, 36 are entirely filled with oil, the bearing 15 may move radially with respect to the ring 17 at slow speeds to accommodate said bearing for distortion between the supports 11, 11. As said bearing moves radially with respect to the ring 17, the chambers 36, 36 in the direction of radial movement of said bearing will be reduced in volumetric capacity and the other chambers will increase in volumetric capacity. This will force the fluid in the chambers of reducing volume through the orifices 35, 35 into the chambers of increasing volume. Where this relative radial motion is slow, it can take place with very little resistance, but if the velocity of this motion is high as where the speed of the shaft is such that there is a tendency to set up a high frequency vibration therein, this relative radial motion will be resisted due to the restricted passageways through which the oil must flow from the chambers of decreasing volume to those of increasing volume. The critical period of vibration of the shaft is thus stabilized by the bearing 15, forming an intermediate support therefor, when vibration tends to occur; and relatively free to move radially at slow speed when there is distortion between the bearing supports 11, 11.

It is, of course, obvious that the dampening unit may be completely filled with oil and the air vent 37 closed and the bearing ring 19 sealed to the end plates 18, 18 of the unit to prevent the leakage of fluid thereby to provide a self-contained unit, making it unnecessary to supply fluid under pressure thereto except after relatively long intervals of time.

It is further obvious that where fluid is supplied to take care of leakage that fluid may be supplied at a pressure just sufficient to fill the interior of the ring and the chambers 36, 36.

Furthermore, while orifices 35, 35 have been shown as connecting the chambers 36, 36 together, the size of the orifices may be varied to suit the required conditions or said orifices may be entirely eliminated, the leakage of fluid past the inner edges of the vanes being relied upon entirely to resist the transfer of fluid from the chambers of decreasing volumetric capacity to those of increasing volumetric capacity.

It will be understood from the foregoing that the shaft vibration stabilizer operates on the principle of energy absorption in much the same manner as a shock absorber in that work is required to force fluid from one chamber to another when the inner ring 19 moves radially with respect to the outer ring 17. The energy of vibration is therefore reduced by the amount of energy absorbed or converted to heat by the stabilizer. This absorption of energy therefore reduces the amplitude of vibration, the force restraining radial movement being proportional to a power of the velocity of radial movement.

Figure 4:
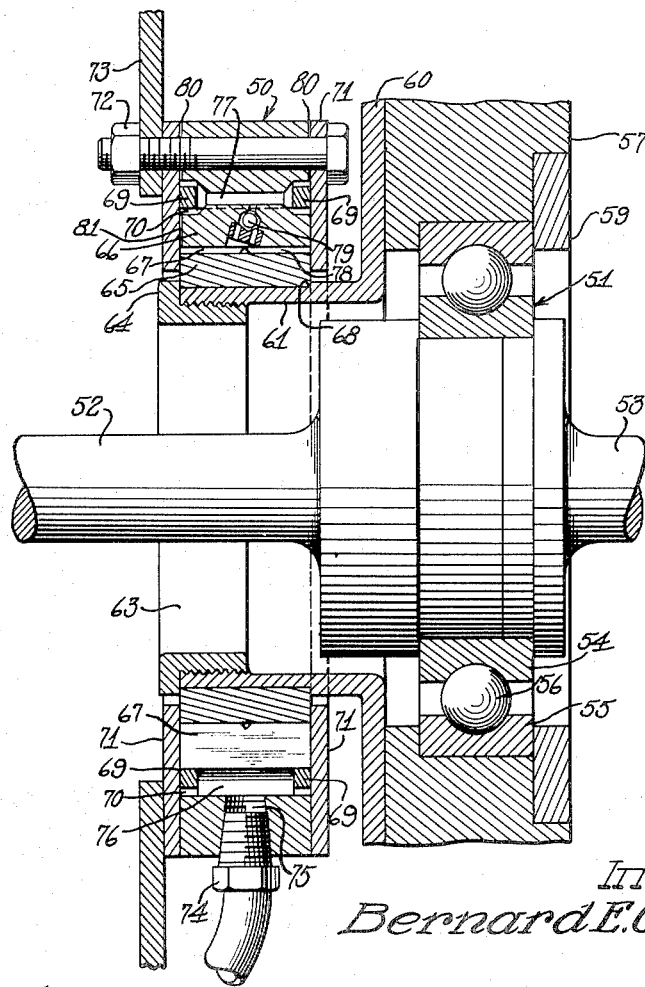
Figure 4 is a sectional view illustrating a modified form in which my invention may be embodied.

In the modified form of my invention shown in Figure 4 a vibration stabilizer 50 is shown as carrying a bearing 51 to one side of said stabilizer, instead of encircling the bearing, as in the form of my invention shown in Figure 1. The bearing 51 is shown for illustrative purposes as supporting adjacent ends of two connected shafts 52 and 53, connected together in end-to-end relation with respect to each other. In this form of my invention the bearing 51 is not of the self-aligning type and is shown as being a well known form of anti-friction bearing including an inner race 54, an outer race 55 and balls 56, 56 rotatably mounting said inner race on said outer race. Said bearing may be a thrust type of bearing to take end thrusts and resist the moment resulting from axial displacement of the vibration stabilizer 50 relative to said bearing. The outer race 55 of the bearing 51 may be mounted in a mounting structure 57, which, in turn, may be mounted on springs (not shown) to provide static supports for the bearing. An end ring 59 is provided to retain the bearing to the block 57 in a usual manner. The end of the block 57 opposite the end ring 59, is shown as abutting a flange 60 of a sleeve 61 to which it is suitably secured. The sleeve 61 is shown as having a retaining collar 63 threaded in its outer end. The collar 63 has a flange 64 abutting the outer end of an inner ring 65 on the sleeve 61, and retaining said ring in engagement with a shouldered portion 68 of said sleeve. The ring 65 may serve the same purpose as the ring 19 in the form of my invention illustrated in Figures 1, 2, and 3.

The ring 65 is encircled by a ring 66, spaced radially outwardly therefrom and having a plurality of radial vanes 67, 67 guided for radial movement with respect thereto. The radial vanes 67, 67 are like the vanes 31, 31 and engage the outer periphery of the ring 65 at their inner ends and engage reaction rings 69, 69 at their outer ends, shown as being floatingly mounted in outwardly facing annular channels 70, 70 formed in the outer faces of the ring 66. Annular end plates 71, 71 are shown as being secured to opposite faces of the ring 68 to close the open ends of the channels 70, 70 and the space between the outer periphery of the ring 65 and the inner periphery of the ring 66. Nuts and bolts 72, 72 may secure the end plates 71, 71 to the outer faces of the ring 66 and may afford a means for connecting the stabilizing unit 50 to a fixed support 73, which may form a rigid mounting therefor. Fluid under pressure is supplied to the inside of the ring 66 through a conduit 74 threaded in a passageway 75, which communicates with a cross passage 76. The cross passageway 76 communicates at its ends with the annular channels 70, 70. The channels 70, 70 communicate with cross passageways 77, 77. Said cross passageways are connected with chambers 78, 78 formed between the inner periphery of the ring 66 and the outer periphery of the ring 65 and the adjacent sides of the vanes 67, 67 by means of check valves 79. Air bleeder passageways 80 and 81 are provided to bleed air from the stabilizing unit to the atmosphere.

In the form of my invention illustrated in Figure 4, the vibration stabilizer 50 resists only high frequency linear vibration. Static support for the bearing may be afforded by attaching the block 57 to an elastic or spring mounting (not shown). Upon high frequency vibration of the shafts 52 and 53, rotating as a unit, the fluid within the chambers 78, 78 will tend to establish an equilibrium around the ring 65. This fluid will offer a resistance to vibration of said shafts, due to the restricted passageways through which the oil must flow from one chamber to the other as the volumetric capacity thereof tends to be reduced and increased, by the tendency for the ring 65 to move radially relatively to the ring 66.

It may be understood that in this form of my invention the stabilizer is more compact than in the form of my invention shown in Figures 1 through 3 and that the ring 65 can move in a radial direction with respect to the ring 66 with little resistance when the motion is slow, but when the velocity is high the resistance to the flow of oil through the orifices in the blades into the chambers in which the volume is increasing will dampen vibration of the shaft and increase the critical speed of the shaft at which vibration occurs, the twisting moments being taken care of by the bearing 51.

It will be understood that modifications and variations may be effected without departing from the scope of the novel concepts of the present invention.

I claim as my invention:

1. A shaft vibration stabilizer comprising a stationary ring, a second ring spaced inwardly therefrom in alignment therewith, means closing the annular space between said rings, a plurality of slidable radial vanes cooperating with said closure means and rings and forming a plurality of communicating fluid chamber means between said rings and restrictive orifice means between said chamber means restricting the flow of fluid to react against said inner ring to restrain high velocity movement thereof in radial and angular directions.

2. A shaft vibration stabilizer including a bearing support, a bearing carried thereby for floating movement with respect thereto, a plurality of sliding radial vanes cooperating with said bearing and bearing support to form fluid pressure chambers between said bearing and support, varying in volumetric capacity upon floating movement of said bearing with respect to said support, and fluid connections between said chambers restricting the flow of fluid therebetween and resisting high velocity floating movement of said bearing.

3. A shaft vibration stabilizer comprising a bearing for an intermediate portion of the shaft, and fluid pressure means restraining movement of said bearing in a radial direction comprising a stationary support for said bearing, supporting said bearing for limited radial movement, and a plurality of vanes slidably carried by said bearing support and having engagement with the periphery of said bearing and forming variable volume fluid pressure chambers between said bearing and support, forming a fluid reaction means for said bearing, to restrain high velocity whirling movement of said shaft with respect to said support.

4. A shaft vibration stabilizer comprising a housing including a ring, a second ring carried by said housing within said first ring for radial movement with respect thereto, a plurality of radial vanes slidably carried by said first ring and having engagement with said second ring, the spaces between said rings and vanes providing fluid chambers, means connecting said vanes to move together upon radial movement of said second ring with respect to said first ring, and means supplying fluid to said chambers to resist high frequency vibration of said first ring.

5. In a vibration stabilizer, a housing including an outer ring, annular side plates extending along opposite sides thereof and inwardly of the inner periphery thereof, an inner ring slidably mounted between said side plates and spaced radially inwardly from said outer ring, a plurality of sliding vanes guided in said outer ring for radial movement with respect thereto and having engagement at their inner ends with said inner ring, means supplying fluid to said chambers, and the spaces between said rings and vanes forming communicating fluid pressure chambers, resisting high velocity radial movement of said inner ring with respect to said outer ring.

6. In a stabilizer for high frequency shaft vibration, a housing having an outer ring and annular side plates extending along opposite sides thereof, means holding said housing stationary, an inner ring slidably mounted between said side plates and spaced inwardly from said outer ring, a plurality of radial vanes slidably carried by said outer ring and having slidable engagement with the outer periphery of said inner ring, each of said vanes having a restricted passageway leading from one side thereof to the other, annular reaction members reacting against the outer periphery of said vanes and moving said vanes inwardly or outwardly as a unit, means supplying fluid to the spaces between said rings and vanes, and the spaces between said rings and vanes forming communicating varying volume fluid pressure chambers accommodating said inner ring for slow radial movement with respect to said outer ring, but resisting high velocity radial movement thereof by the resistance to the flow of fluid through said restricted passageways in said vanes.

7. In a shaft vibration stabilizer, a stationary support including a ring having annular side plates secured to opposite sides thereof and extending inwardly of the inner periphery thereof, a self-aligning bearing coaxial with and in alignment with said ring and having an outer race slidably guided between said side plates, a plurality of radially sliding vanes slidably carried by said outer ring for engagement with said outer race, means retaining said vanes in engagement with said race and radially moving said vanes together, the spaces between said vanes comprising varying volume fluid pressure chambers, restricted fluid passageways in said vanes connecting said chambers together, means supplying fluid under pressure to said chambers and holding fluid under pressure therein, and accommodating said outer race for slow radial movement with respect to said ring, but restraining said outer race from high velocity radial movement due to the restriction to the flow of fluid through said restricted passageways from the chambers of low volumetric capacity to those of high volumetric capacity.

8. A shaft vibration stabilizer including a bearing, dynamic stabilizing means therefor, offset axially therefrom, said dynamic stabilizing means including two aligned radially spaced rings and side plates closing the space between said rings, one of said rings being radially movable with respect to the other and carrying said bearing, the other of said rings having a plurality of sliding vanes carried thereby for engagement with said one ring and forming a plurality of fluid chambers therebetween, said vanes being movable radially of the other of said rings upon radial movement of said one ring with respect to said other ring to vary the volume of said chambers, means supplying fluid to said chambers, and restricted passageways between said chambers resisting the flow of fluid from the chambers of reducing volume to those of increasing volume upon high velocity radial movement of said one ring with respect to said other ring.

9. A shaft vibration stabilizer including a shaft bearing, dynamic stabilizing means therefor, offset axially therefrom, and comprising two radially spaced aligned rings and side plates closing the space between said rings, means holding the outer of said rings stationary, and the inner of said means being radially movable between said side plates and carrying said shaft bearing, the outer of said rings having a plurality of sliding vanes carried thereby and forming a plurality of fluid chambers between said rings varying in volume by relative movement of said inner ring with respect to said outer ring, means supplying fluid to said chambers, and restricted passageways between said chambers resisting the flow of fluid from the chambers of reducing volume to those of increasing volume upon the tendency for said bearing to set up high velocity radial movement of said one ring with respect to said other ring.

10. A shaft vibration stabilizer comprising a stationary rigid housing, a rigid ring mounted in said housing for radial movement with respect thereto, and fluid pressure means reacting against said ring in radial directions and restraining high velocity movement thereof in radial and angular directions and comprising a plurality of radial vanes slidably carried within said housing and engaging the periphery of said ring and with said ring and housing comprising a plurality of varying volume fluid pressure chambers reacting against said ring.

11. A shaft vibration stabilizer comprising a rigid stationary ring, a second rigid ring spaced inwardly therefrom and mounted for radial movement with respect thereto, and varying volume fluid reaction means interposed between said rings and including a plurality of slidable radial vanes slidably carried by one of said rings and engaging the other of said rings and forming therewith a plurality of fluid pressure chambers to restrain high velocity movement of said second ring in radial and angular directions.

References Cited in the file of this patent

UNITED STATES PATENTS

| | | |
|---|---|---|
| 2,515,861 | Campbell | July 18, 1950 |
| 2,557,542 | Kapitza | June 19, 1951 |
| 2,576,141 | Picke | Nov. 27, 1951 |
| 2,631,901 | Holben | Mar. 17, 1953 |